United States Patent [19]
Borzenski

[11] Patent Number: 4,830,506
[45] Date of Patent: May 16, 1989

[54] CONTROL SYSTEM FOR RAM FED MIXING MACHINE

[75] Inventor: Frank J. Borzenski, Branford, Conn.

[73] Assignee: Farrel Corporation, Ansonia, Conn.

[21] Appl. No.: 865,898

[22] Filed: May 21, 1986

[51] Int. Cl.<sup>4</sup> ............................................. B01F 7/02
[52] U.S. Cl. ........................................ 366/76; 366/97
[58] Field of Search .................... 366/76, 77, 96, 97, 366/83, 84, 85, 71, 72, 73, 132, 151, 150, 153, 79, 80, 81; 425/201, 209, 135, 162, 167

[56] References Cited

U.S. PATENT DOCUMENTS

| | | | |
|---|---|---|---|
| 1,516,488 | 11/1924 | Banbury | 366/150 X |
| 2,962,186 | 11/1960 | Gottschalk | 220/57 |
| 3,239,878 | 3/1966 | Ahlefeld, Jr. et al. | 366/77 |
| 3,396,429 | 8/1968 | Geyer | 425/201 X |
| 3,610,585 | 10/1971 | MacLeod et al. | 259/6 |
| 3,921,963 | 11/1975 | Neff et al. | 366/151 X |
| 3,999,046 | 12/1976 | Porter | 366/77 X |
| 4,455,091 | 6/1984 | Bamberger et al. | 366/76 |

FOREIGN PATENT DOCUMENTS 2163061 2/1986 United Kingdom .

OTHER PUBLICATIONS

Celesco Transducer Products, Inc. Product Bulletin on PT 801, 3 pages.

Primary Examiner—Harvey C. Hornsby
Assistant Examiner—Scott J. Haugland
Attorney, Agent, or Firm—Parmelee, Bollinger & Bramblett

[57] ABSTRACT

A batch mixer has position monitoring means for the ram operably coupled to the ram moving motor to move the ram within a range of positions adjacent the ram's "down" position to improve mixing by allowing limited upward movement of the ram as a result of internal pressures inside the mixer. Excessive ram return movement is prevented however, and the limited ram movement is achieved by feedback control influence on the pressure to the fluid actuator that operates the ram. Also disclosed is a feed-back control for batch size to assure that optimum use is achieved for the mixer during each batch mixing interval.

25 Claims, 9 Drawing Sheets

CONTROL SYSTEM FOR RAM FED MIXING MACHINE

The invention relates generally to mixing machines of the type having a mixing chamber and rotating winged rotors provided therein for mixing batches of ingredients fed to a charging chamber communicating with the mixing chamber. A reciprocable ram moves the ingredients from the charging chamber into the mixing chamber and cooperates with the mixing chamber to define a portion of this mixing chamber. Once mixed, the ingredients are removed through a discharge opening and the opening is then closed for feeding a further charge into the mixing chamber by means of the ram.

The ingredients being worked in the mixing chamber are under pressure imposed by the ram. The ingredients may consist of powder or other finely divided material as well as large chunks of other material such as rubber or elastomers and the interaction between the rotors and these ingredients has a tendency to exert cyclically varying forces on the ram itself during the mixing process.

The present invention provides a new and improved system for controlling the ram during this mixing process so as to improve the mixing process itself, and to provide the machine operator with a readout of certain critical parameters such that he will be better equipped to operate the machine during the mixing of succeeding batches. Alternatively, signals are provided to a comparator to control the mixer. Those knowledgeable in the operation of a mixer know that from a machine utilization viewpoint as well as a mixing uniformity viewpoint in most cases it is desirable to place the ingredients to be mixed into the mixing chamber as quickly as possible. This is best accomplished by using maximum ram pressure. On the other hand, once the ingredients have been charged into the mixing chamber, a certain amount of ram motion is desirable as an indication of good material exchange from rotor to rotor. Maximum ram pressure would inhibit this, so a reduced ram pressure is desirable after the material has been fully charged into the mixing chamber. It is the purpose of this invention to disclose a control system which measures the amount of ram motion during the mixing cycle and which adjusts the ram pressure to optimize mixing performance. In addition, the system will provide data to indicate if the mixing charge to the mixer is either too large or too small and will make adjustments to subsequent batches.

Figure 1:
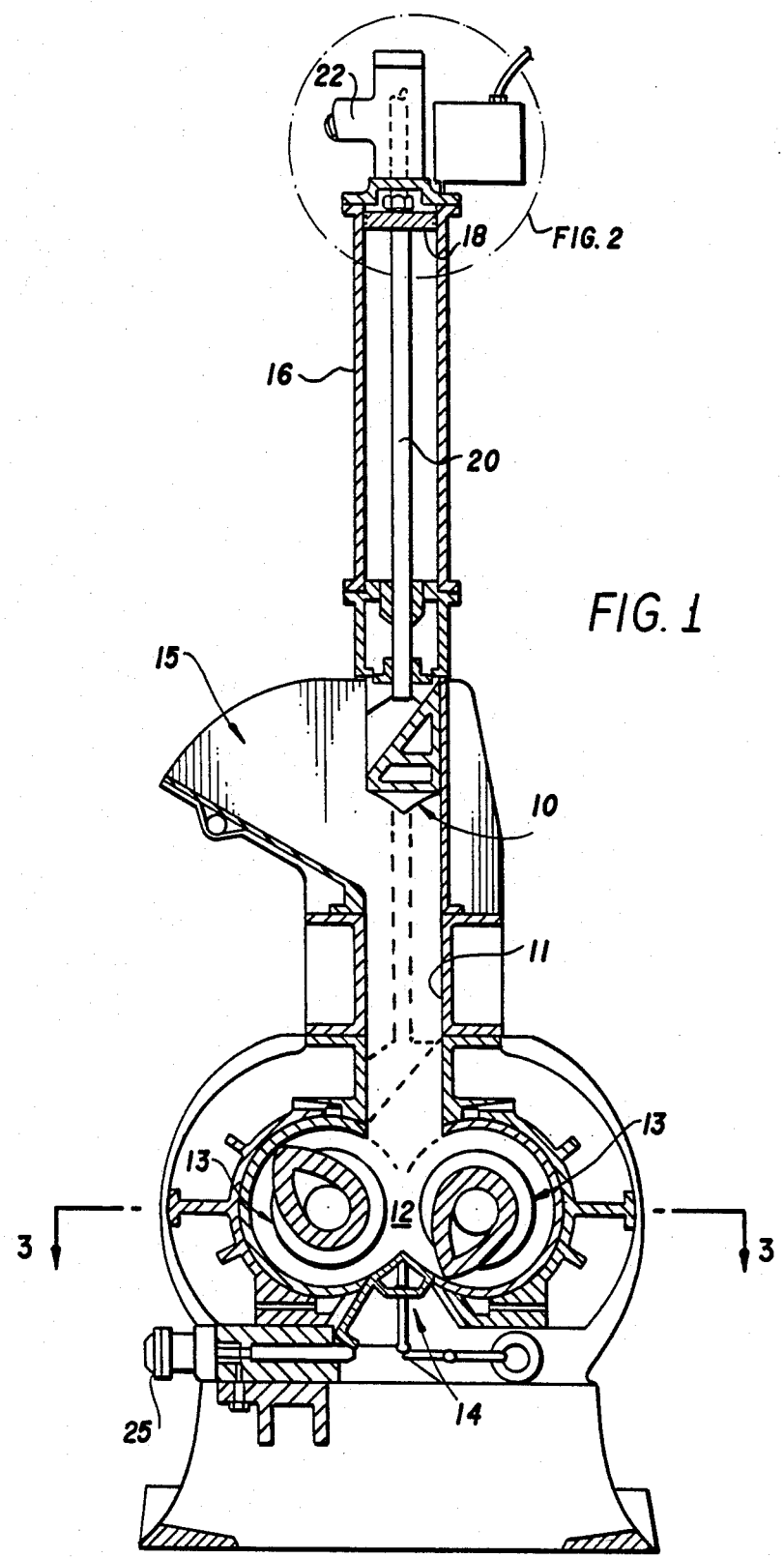
FIG. 1 is a schematic view illustrating the overall machine in vertical section.

Turning now to the drawings in greater detail, FIG. 1 shows a mixing machine including a vertically reciprocable ram 10 movable between the solid line position shown and the broken line position shown to move a charge of ingredients to be mixed from a charging chamber 11 into a figure eight mixing chamber 12 where two counter-rotating rotors 13 are adapted to act on these ingredients to achieve a thorough mixing thereof. The reader is referred to U.S. Pat. No. 3,610,585 and to U.S. Pat. No. 2,962,186 for a more complete description of such a mixing machine. The ingredients are introduced into a hopper 15 while the ram 10 is in its raised position as shown in solid lines so that the ingredients drop downwardly into the aforementioned chamber 11 where they can be compressed and fed into the mixing chamber. Once a charge has been mixed a hinged door 14 opposite the ram 10 can be opened to withdraw the mixed materials. A locking device 25 is provided for securing the door 14 in place during the mixing process. The ram 10 is preferably operated by a vertically reciprocable fluid motor in the form of linear actuator 16 having a movable piston 18 provided in a fixed cylinder for movement of actuating rod 20. The ram 10 is attached to the lower end of the actuating rod externally of the cylinder 16 and air pressure is provided in line 22 for urging the piston downwardly from the solid line position shown in FIG. 1 to the broken line position of that view. Upward return movement may also be achieved by air pressure, or by other means.

Figure 2:
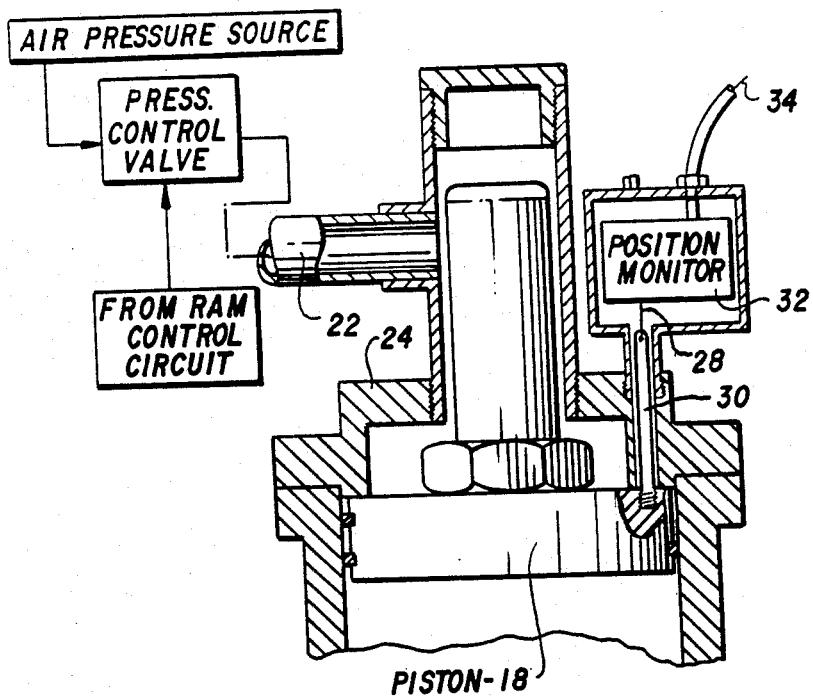
FIG. 2 is an enlarged sectional view of the region illustrated at the top of the apparatus of FIG. 1.

In accordance with the present invention a transducer 32 is provided on the upper or head portion 24 of the cylinder 16 as best shown in FIG. 2. More particularly, a Celesco Model PT-801 available from the company of the same name at 7800 Dearing Avenue, Post Office Box 1457, Canoga Park, Calif. 91304 is secured in the head 24 of the cylinder and this device includes a coiled cable 28, one end of which cable is attached to a post 30 threaded into the piston 18. Said one end of cable 28 is movable with the piston 18 and provides the requisite movement for an electrical potentiometer which provides output signals related to movement of the cable and hence to reciprocating movement of the piston. Since the piston is directly connected to the ram 10 the output signal in line 34 provides an electrical analog of the position for the ram 10. Alternative means for detecting ram position could be substituted for the above described monitoring means.

Figure 3:
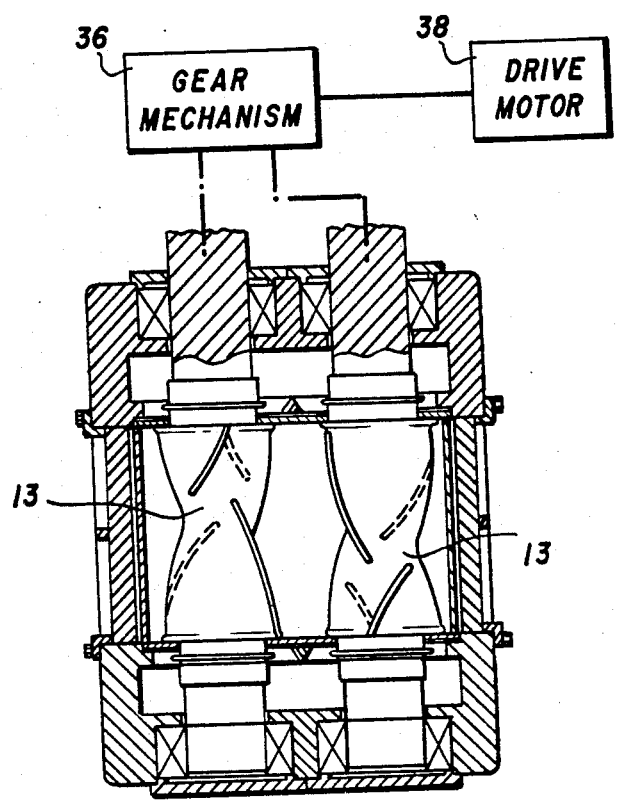
FIG. 3 is a horizontal section taken generally on the line 3—3 of FIG. 1.

FIG. 3 illustrates the counter-rotating winged rotors 13 and also illustrates in schematic fashion the gear mechanism 36 for driving the same. Gear mechanism 36 is driven through a gear reduction by motor 38 and in accordance with known control systems the speed of drive motor 38 can be varied.

Figure 4:
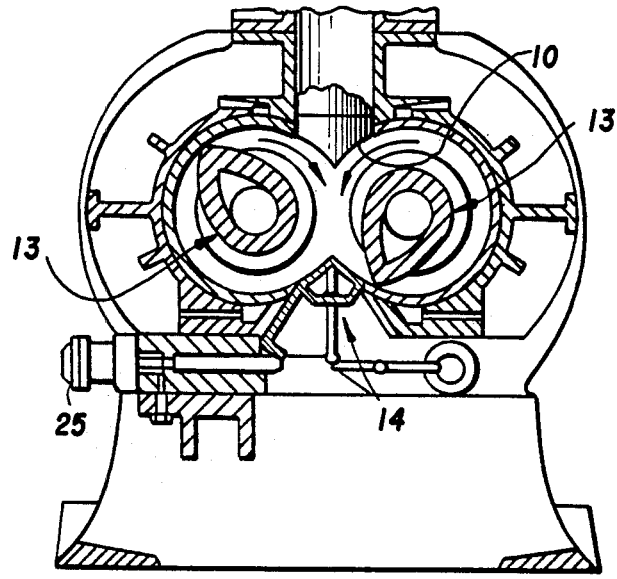
FIG. 4 is a vertical section through the lower portion of the machine illustrated in FIG. 1 and showing the ram in its down position.

FIG. 4 illustrates the mixing chamber when the ram 10 is in its limit position such that the counter-rotating wings of the rotors will just clear the lower surface of the ram during the mixing process. Actually, the forces generated inside the mixing chamber during this mixing operation will cause ram 10 to move upwardly as the wings rotate below the ram. This feature is one which can actually improve the mixing process provided only that this upward movement is not excessive so as to cause gathering of mixing material in the throat area between the charging chamber and the mixing chamber.

With particular reference to FIG. 1, the ram 10 is there shown in two positions one in solid and one in broken lines. The broken line position corresponds to the solid line position of FIG. 4 and defines a lower limit position for the ram such that proper clearance is achieved between it and the counter-rotating wings of the rotors 13. The solid line position of FIG. 5 indicates a predetermined upper ram position. That is a practical upper limit position that can be tolerated without leading to the undesirable accumulation of ingredients in the throat of the charging chamber as mentioned previously. The present invention seeks to confine ram movement during mixing within these two ram positions, and to tolerate a predetermined degree of bouncing of the ram during mixing in order to take advantage of this bouncing to improve the mixing action of the winged rotors themselves.

Figure 5:
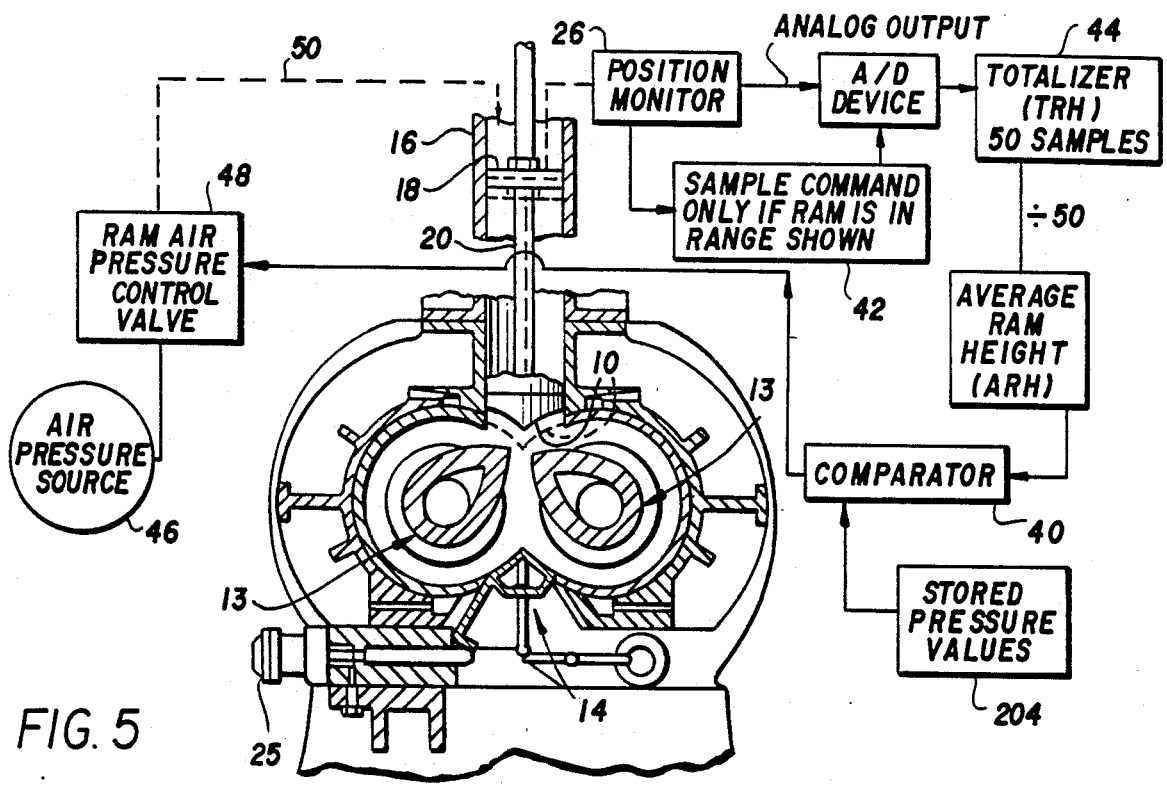
FIG. 5 is a block diagram to illustrate the components of the system devised for controlling ram pressure when the ram is in a region adjacent to this ram down position.

In accordance with the present invention FIG. 5 shows a system for monitoring ram position, at least within a range of positions adjacent the limit position. A transducer is attached to the ram actuating piston 18 for generating an analog output signal indicative of ram position to a control circuit as shown in FIG. 5. The transducer presently preferred for the system shown in FIG. 5 is Celesco Model PT-801. This device, 32 in FIG. 2, is capable of providing an electrical output voltage signal in line 34 directly related to displacement of the cable 28.

This device is coupled to a control circuit such as shown in FIG. 5 so that 50 sample readings can be averaged to provide an "average ram height" signal for comparison purposes. As shown in FIG. 5 comparator circuitry 40 is provided for this purpose. Since ram position signals are only required adjacent the end of the travel for the ram, a sample command latch circuit 42 provides the digitized sample signals to totalizer 44 as shown. Dividing by the programmed sample number (50) provides the (ARH) average ram height to comparator 40.

The ram piston 18 is air operated, at least in its downward movement, and a source 46 of fluid (air) under pressure provides air pressure to the top of piston 18 through control valve 48. The valve 48 provides normal (high) pressure to the piston when the ram is moved down. A lower air pressure is provided in response to a positive compare signal from comparator 40. Piston 18 is preferably biased downwardly by conventional air pressure, but when the ram reaches the limit position shown in broken lines air pressure in line 50 is reduced by control valve 48 to a lower that allows the ram to be moved back up under the forces generated in the mixing chamber, thereby enhancing the mixing process as a result of the fact that this upward ram movement is limited to movement within a predetermined range. Once ram 10 reaches a preset upper limit position, within this range, air pressure is increased to drive the ram downwardly once again. Thus, ram 10 provides a continuously variable downward force on the ingredients of the mixer as dictated by the internal pressures within the mixer itself.

Figure 6:
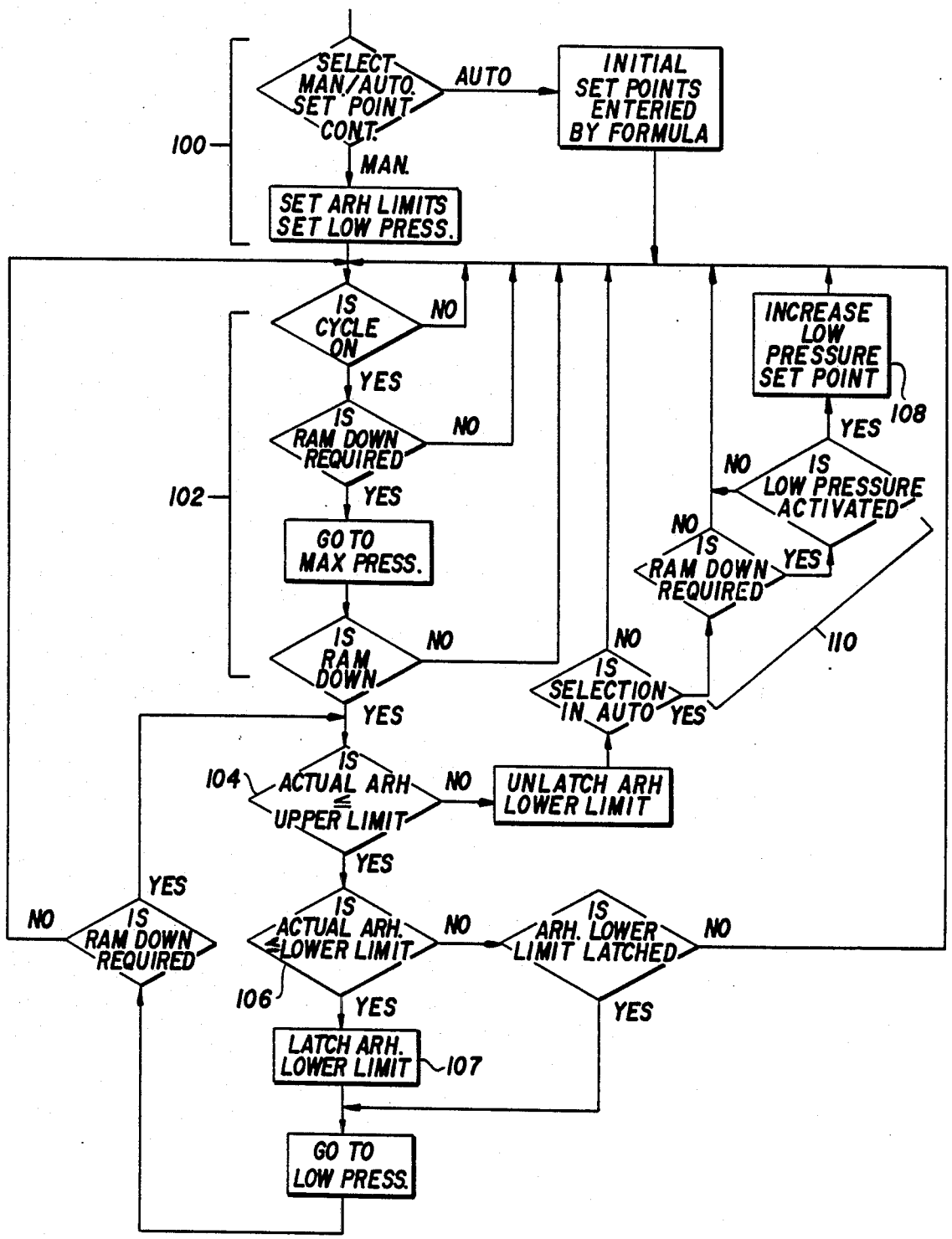
FIG. 6 is a flow chart showing in diagrammatic form the logic format for achieving the control of ram pressure to realize the results of the present invention.

FIG. 6 shows a programmed microprocessor controlled ram motion control system in flow chart form. The ram limit positions are set manually by the machine operator or automatically by reference to stored data as suggested at 100. Once the mixer's cycle is initiated (that is, after charging the hopper 15 with the requisite ingredients) ram 10 is moved down under the higher of two pressure levels as suggested at 102.

Once ram 10 reaches the range of down positions defined by upper and lower predetermined limits (as shown at 104 and 106) the pressure to piston 18 is selectively provided, high or low, so as to control ram motion within this range to achieve an improved mixing operation. Also shown in FIG. 6 is the logic 107 for latching the low pressure until the ram reaches its upper (limit) position as dictated by the range of positions preset at 100. FIG. 6 also shows that the low pressure level itself can be modified in the event that ram 10 fails to function as described above. If ram 10 rises above its upper limit while under low pressure and if the automatic mode is in use, means 108 is provided for increasing the low pressure set point to avoid such a result.

Figure 7:
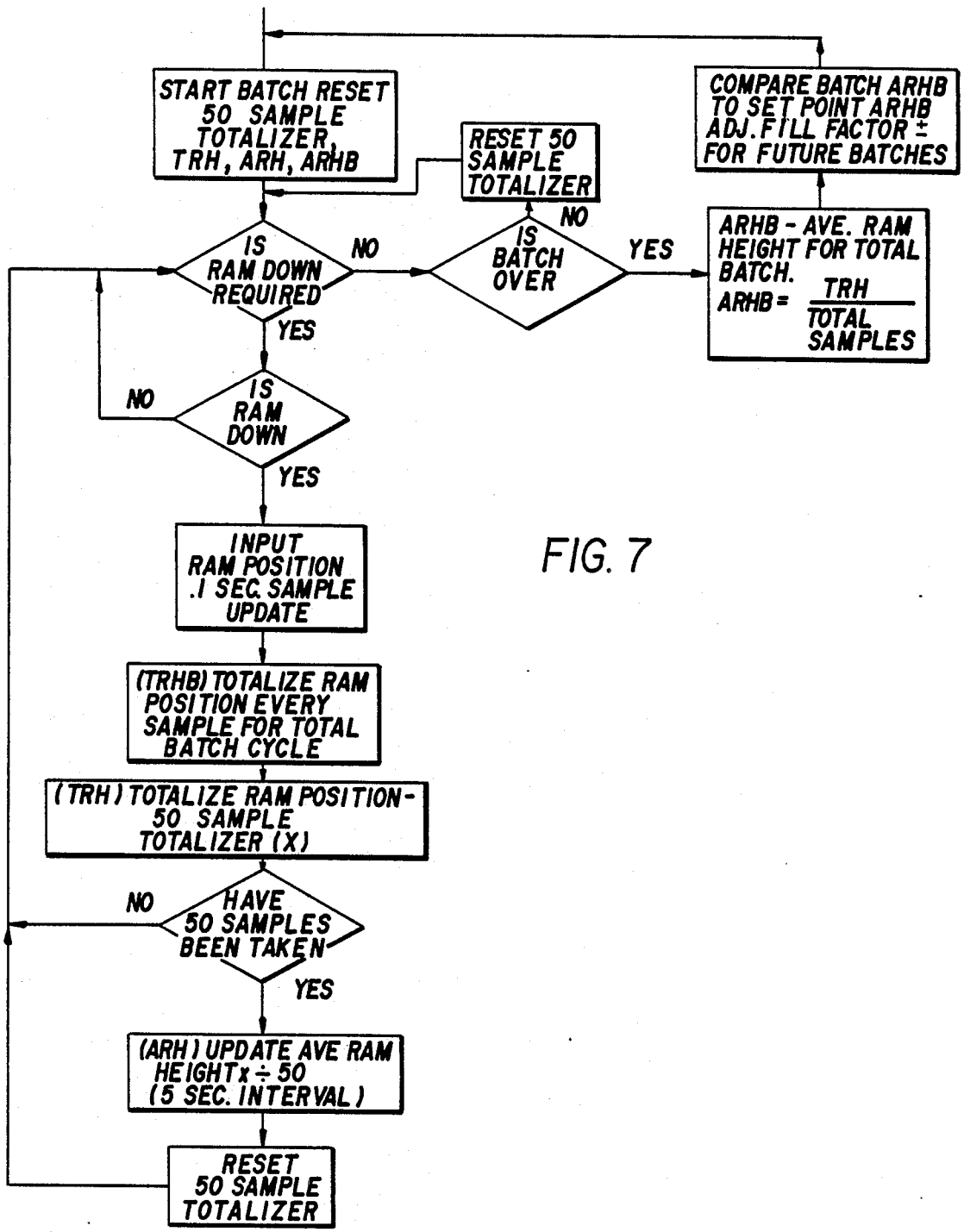
FIG. 7 is a flow chart showing in diagrammatic form the logic format for averaging and totalizing the ram position monitoring required to input the comparisons required in FIG. 6.

FIG. 7 illustrates in flow diagram format one approach to programming a microprocessor to carry out certain functions depicted in the system of FIG. 5 for totalizing the sample ram positions when the predetermined ram down position range is achieved. Once ram reaches a predetermined "down" position 50 samples of actual ram position are totaled (TRH) over a five second interval and averaged (÷50) to provide an average ram height (ARH). This average value is stored for use in the comparison made with the logic of FIG. 6. Every five seconds, while the ram is in the range of down positions preset at 100 in FIG. 6, this comparison is repeated. Although the totalizer (TRH) is reset to zero after each five second interval, a batch cycle totalizer (TRHB) provides a running total of these samples, and an average ram height over the batch cycle (ARHB) is calculated by dividing TRHB by the total number of samples added during the cycle. ARHB may be calculated at the end of the cycle, or alternatively at a predetermined time during the cycle.

Figure 8:
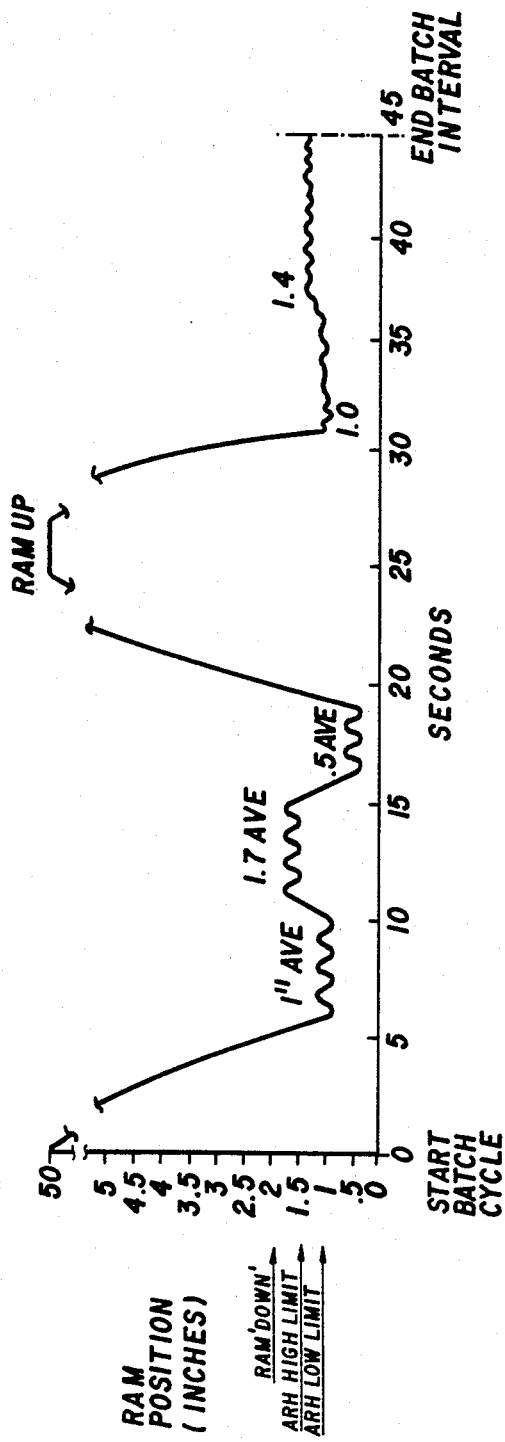
FIG. 8 shows graphically the actual ram position during a typical mixing cycle.
Figure 9:
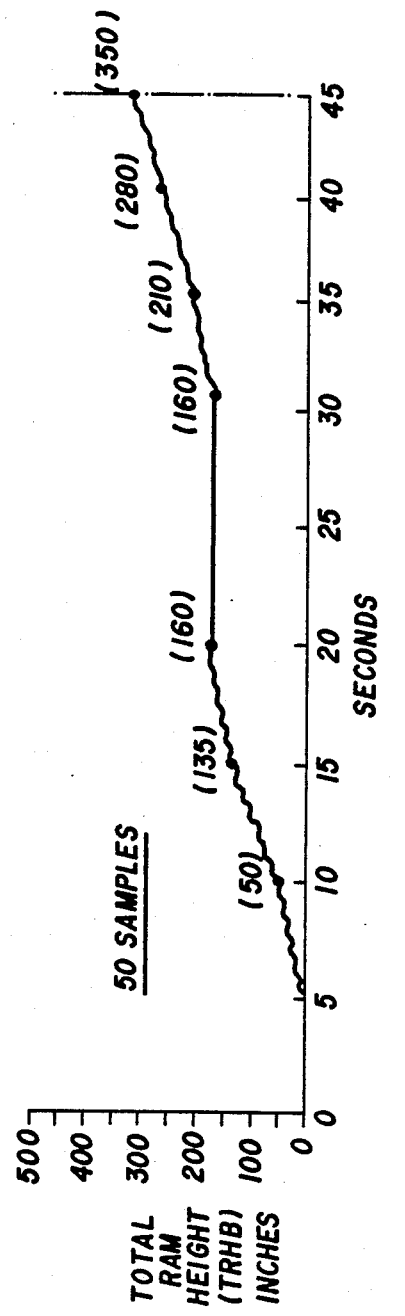
FIG. 9 shows the data recorded in the totalizer (TRHB) of FIG. 7 during the FIG. 8 cycle.

FIGS. 8-12 inclusively illustrate graphically the variation of these parameters during a typical batch cycle. FIG. 8 shows ram position as read by the transducer (after converting the transducer's millivolts output to inches). The cycle shown is approximately 45 seconds in total time as shown on the horizontal axis of all these views. The "cycle" time with the ram in the "down" position is 30 seconds, that is from time=5 seconds to 20 seconds and from 30 seconds to 45 seconds. Thus, total number of samples=300 (30 sec. divided by 0.1 sec./sample). The range of ram down positions preset in the system is between 1.0 and 1.5 inches on the position monitor or transducer. The ram is "down" so as to start the 0.1 second sampling once the 2.0 inch ram position has been reached. This occurs at the five second mark in the example shown. FIG. 9 shows the results for totalizing ram height over the entire cycle while the ram is below the "down" position, yielding a value of 350 at end of the cycle.

It should be noted that this process will accommodate a ram up interruption during the batch cycle, such as is sometimes required to add ingredients to the batch after a preliminary mixing of the initial ingredients. The total ram height for the batch, recorded in FIG. 9 (TRHB) remains constant (at 160) while the ram is above the "down" position (2.0 inches).

Figure 10:
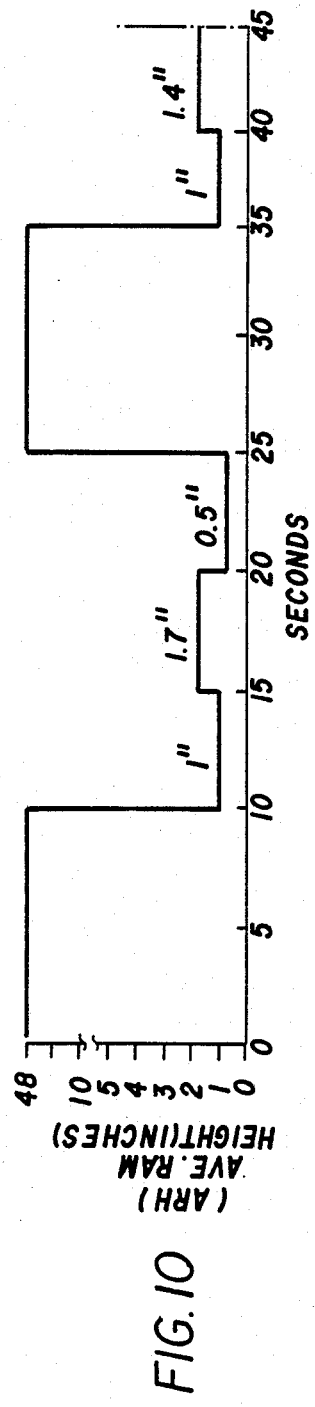
FIG. 10 shows the average ram height values (ARH) such as are provided to the comparison logic of FIG. 6 during the FIG. 8 cycle.
Figure 11:
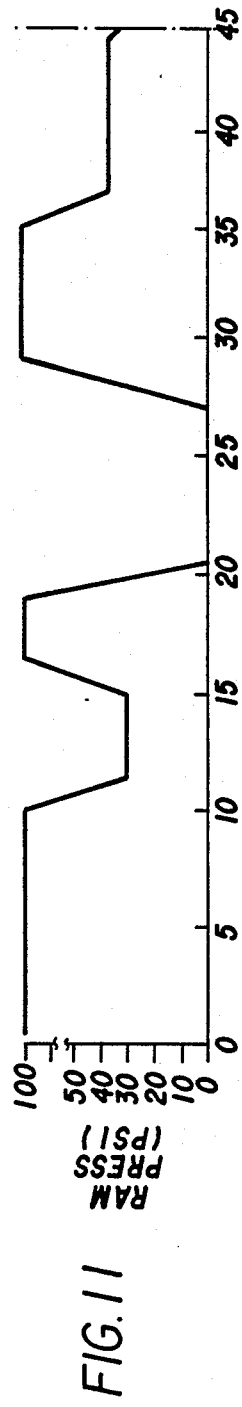
FIG. 11 shows graphically the variations in fluid pressure to the ram actuating piston that result from subjecting several averaged ram positions to the logic of FIGS. 6 and 7 during the mixing cycle of FIG. 8.
Figure 12:
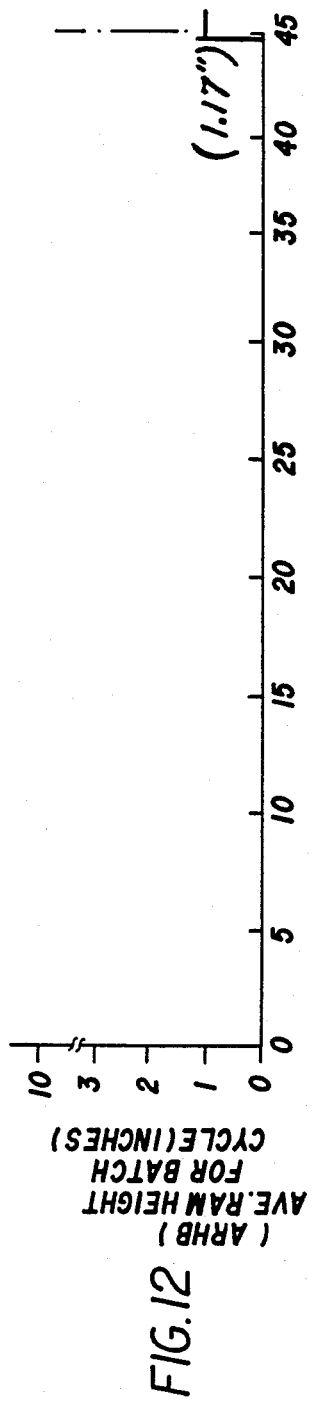
FIG. 12 shows the end of cycle averaging of ram height, at least while the ram is within the range of ram positions where control of the ram is both monitored and controlled.

From FIG. 8 it is seen that during the first five seconds of totalizing, ram positions in the range 0.8 of an inch to 2.0 inches occur (between approximately five and ten seconds into the cycle). Therefore, sample totalizer (TRH) will provide an average ram height (ARH) of 1.0 for the ensuing five second period as shown in FIG. 10. Furthermore, since this ARH is at the low limit, a reduction in air pressure from 100 psi to 30 psi (FIG. 11) will occur. This results in a slight raising of the ram as suggested in FIG. 8 at approximately the eleven second point in the batch cycle. In fact, in the example shown, this result leads to ram positions during the ensuing 10 sec-15 sec portion of the ram cycle that yield an average ram height (ARH) of 1.7 inches. Since 1.7 inches exceeds the high limit of the selected range (1.5 inches) air pressure is raised back to 100 psi during the next succeeding five second sampling period.

This pressure increase leads to a ram down movement to 0.5 inch ARH as shown in FIG. 8 between the 15–20 second interval. Since 0.5 inches ARH is below the preset low limit (1.0 in) another air pressure decrease would be in order. However, the machine's automatic ram control is interrupted in the example shown by the ram up movement required to add ingredients to the batch. This brings the ram out of the controlled range and the automatic control is rendered inoperative until the ram once again moves down into the range where control is achieved. As shown in FIG. 8 the ram reaches 1.0 inch and after 50 samples are read and averaged the new ARH is 1.0 inch. Since this is equal to the low limit, the air pressure is reduced to 30 psi. As mixing continues, the ram rises slightly. After 50 more samples are taken, ARH is computed as 1.4 inches. Since this does not exceed the high limit (1.5 inches), air pressure is maintained at the 30 psi level. This procedure continues until the "end of batch" signal causes ram to be raised. The last ARH calculated at the end of the cycle is 1.4 inches as suggested in FIG. 10, and although this ARH has no effect on air pressure or on ram position it does get displayed for the machine operator and so too the total ram height over the entire batch cycle (TRHB) will also reflect this result (FIG. 9) as will the average ram height for the batch (ARHB) in FIG. 12.

FIG. 6 shows that two modes of operation can be selected in this microprocessor controlled ram pressure control system. In the manual mode ARH upper and lower limits are entered manually, as are the air pressure limits. Air pressure to the ram is either high or low as a result of the average ram height calculated as described above (and as long as ram position is below the ram "down" position).

An auto set mode is also provided for in FIG. 6 and two refinements to the above described control system are engrafted onto said system in this auto set mode. First, the set points (ARH high and low) are entered automatically from the data storage referred to previously. Secondly, the low pressure limit to the ram piston is controlled in the auto set mode. When ARH exceeds its upper limit after having been at its low limit (as if ARH should exceed 1.5 in the example above) another logic branch circuit 110 provides an incremental increase in the low pressure set point to avoid such an overshoot in ARH during any succeeding ram air pressure reduction after again having brought the ram to its low position by application of "high" pressure.

Figure 13:
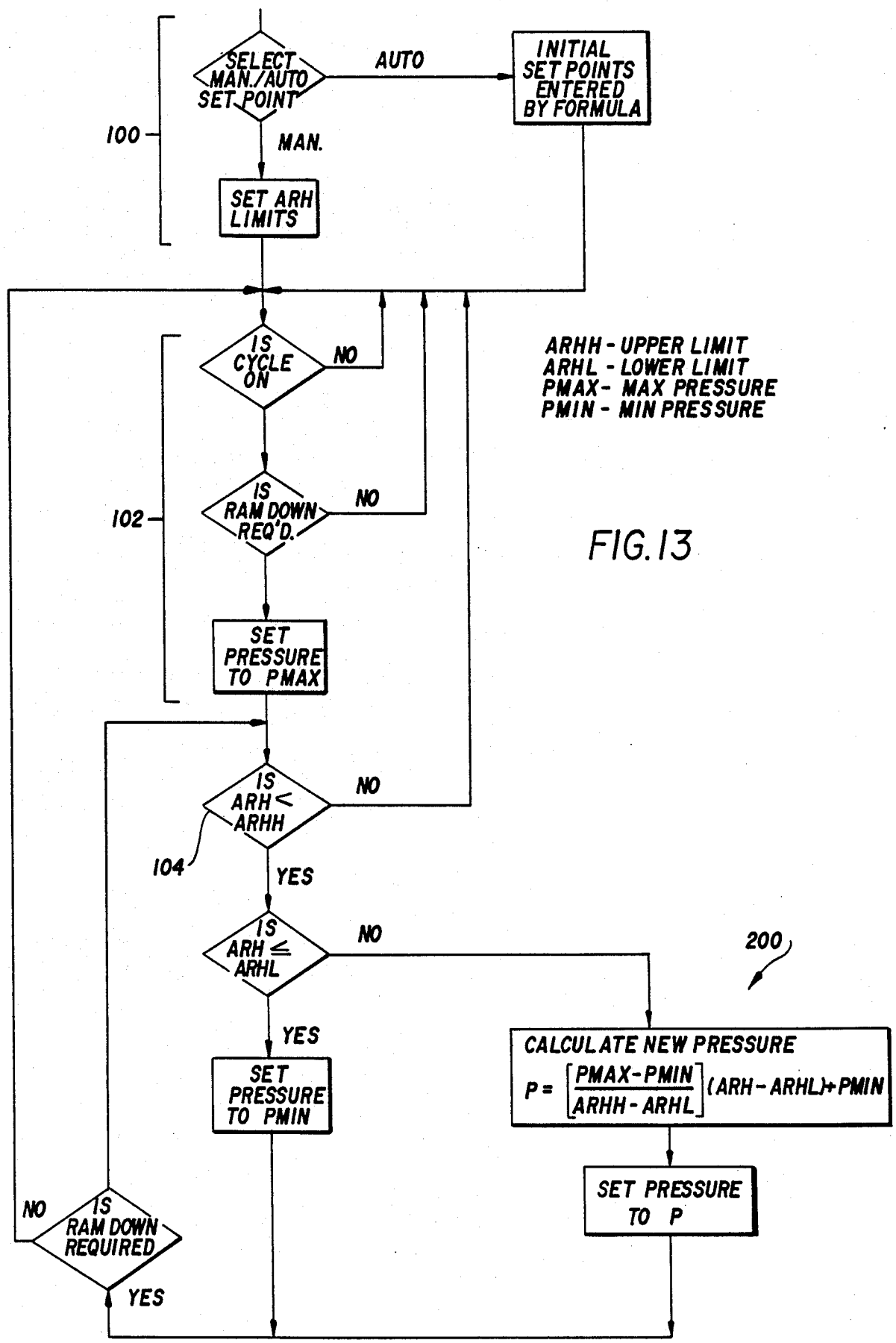
FIG. 13 is a flow chart showing in diagrammatic form the logic for achieving a continuously variable ram pressure between the high and low pressure of the FIG. 6 version.

The above described system is further improved in FIG. 13 wherein air pressure to the ram cylinder is varied continuously in the range selected.

As illustrated in FIG. 13 the ram down logic is similar to that of FIG. 6 in that limits (low, ARHL and high, ARHH) are preset, or provided from data storage, to control ram pressure. However, instead of a simple two step or two pressure level control as suggested in FIG. 6, the logic of FIG. 13 provides for a first order algorithim or linear relationship, as expressed in the formula at 200 in FIG. 13, where P is the resulting pressure calculated from the formula:

$$P = \left[ \frac{P_{max} - P_{min}}{ARHH - ARHL} \right] \ast (ARH - ARHL) + P_{min}.$$

ARHH is the average ram height high limit as preset for a particular batch, and ARHL the low limit. ARH is, again, the average ram height per FIG. 10 above. Two end point pressures, Pmax and Pmin, are still provided for to define the limits for this linear relationship. Although a linear relationship is the presently preferred formula for precise control of ram pressure in the range of ram positions preset by the machine operator other relationships can be provided for within the scope of the present invention. In FIG. 5 for example, comparator 40 may have any convenient format for the stored pressure values indicated at 204. If only two pressures, low and high, are utilized the FIG. 6 version is provided for. If more detailed pressure control is to be provided for (as in the FIG. 13 version) the appropriate values can be stored or calculated according to a predetermined relationship (such as shown at 200 in FIG. 13).

Figure 14:
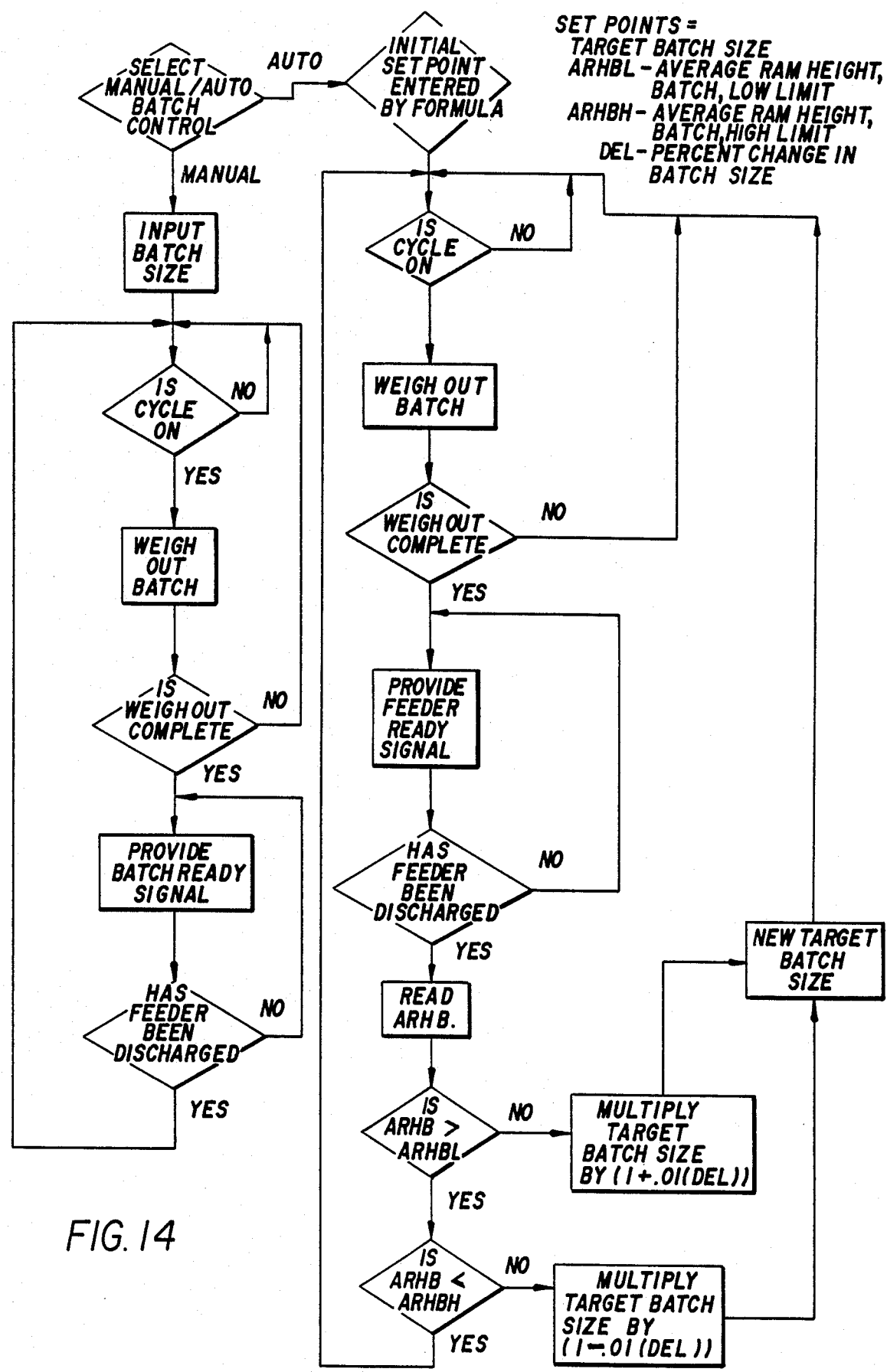
FIG. 14 is a flow chart showing in diagrammatic format the logic for varying batch size as a result of comparing the average ram height or position for a total mixing machine cycle, to a target value.

As mentioned previously the mixing machine operator may himself set the ram height limits, or these values may be automatically set based upon a prior run or runs. FIG. 14 shows a further refinement to this automatic mode wherein the batch weight is altered incrementally to achieve maximum mixing efficiency in a series of runs where the ingredients are the same for several successive batches.

A "target" batch size must be selected initially by the machine operator, but once this initial batch weight has been mixed (as described above with reference to FIG. 6 or 13 for example) the ARHB (Average Ram Height for Total Batch)=(Total Ram Height/Total Samples) is known. See FIGS. 7 and 12. If the operator has selected too high a batch size for the ingredients to be mixed, he will encounter excessive ram heights and mixing may suffer as described above. if, on the other hand, he has selected too small a batch size he will not reach the levels of production possible with the ingredients involved.

FIG. 14 shows a system for assuring that both conditions are satisfied or at least more likely to be attained than is the case under the constraints of prior art mixing machine operations.

The left side of FIG. 14 (labelled "manual") shows the conventional logic involved in weighing out the batch or charge to be mixed. The "cycle" referred to is that of the prior art mixer (such as shown in U.S. Pat. No. 3,610,585 for example). The diagram differs from the prior art only to the extent necessary to afford the machine operator opportunity to himself select this "manual" mode if he wants to override the "auto" mode to be described.

The right side of FIG. 14 adds at least one other loop to the conventional logic of the "manual" mode to provide an automatic batch size increase (and in another loop—decrease) depending upon the average ram height total for the previous batch (ARHB) read from the logic flow of FIG. 7. More particularly, if ARHB is less than a preset lower limit (ARHBL) the batch size is incrementally increased by a small percentage (1%) to provide a new "target" batch size. If ARHB is greater than a preset upper limit (ARHBH) the batch is incrementally decreased by a small percentage (1%) to provide a new "target" batch size.

In conclusion, the present invention provides for monitoring ram motion and comparing these results to certain stored ram height parameters to vary ram pressure during the same mixing cycle, and to vary batch size during subsequent mixing cycles so that optimum mixing can be achieved in the chamber of a machine with non intermeshing counter-rotating winged rotors.

I claim:

1. In combination with a mixing machine having a housing with a mixing chamber and rotors therein for mixing ingredients provided in batches to a charging chamber communicating through a throat area with the mixing chamber, and a reciprocable ram for moving the ingredients from the charging chamber through the throat area into the mixing chamber, said ram cooperating with the housing to define a part of the mixing chamber, the improvement comprising:
    (a) fluid motor means for moving said ram toward a lower limit position wherein said ram is located adjacent the path of movement of the rotors but does not interfere with them,
    (b) fluid pressure control means for selectively coupling said fluid motor means to a source of fluid under pressure, said control means capable of providing at least two fluid pressure levels selectively to said fluid motor means (High and Low),
    (c) means for monitoring ram position, at least within a range of ram positions adjacent said lower limit position, and providing output signals related to ram position,
    (d) means for comparing said output signals to stored data representing upper limit and lower limit ram positions within said range,
    (e) said control means being responsive to said comparison means and being responsive to comparison between the output signals and said stored data representing the upper limit position indicating an existing ram position above said upper limit position to provide a high pressure to said fluid motor.

2. The combination of claim 1 wherein said pressure control means is also responsive to comparison between the output signals and said stored data representing the lower limit position indicating an existing ram position below said lower limit position to provide a low pressure to said fluid motor.

3. The combination of claim 2 wherein the rotors acting on the ingredients being mixed generate forces inside the mixing chamber acting upon the ram tending to push the ram in a direction away from said mixing chamber and said low pressure level is sufficiently low to allow said ram to react to the forces in the mixing chamber by movement in a direction opposite to said movement toward said limit position.

4. The combination of claim 3 wherein said high pressure level is so selected that the forces generated inside the mixing chamber by the rotors acting on the ingredients being mixed cannot cause excessive movement of said ram in a direction opposite said movement toward said limit position, said excessive movement being defined as that ram position which creates an excessively large cavity for trapping ingredients in said throat area.

5. The combination of claim 4 further characterized by batch cycle totalizer means responsive to said output signals for calculating an average ram height over a batch cycle (ARHB) and means for preselecting a high limit (ARHBH) for said ARHB and for preselecting a low limit (ARHBL) for said ARHB, means for preselecting a target batch size for said charging chamber, and means for incrementally decreasing subsequent target batch size in response to said ARHB not being less than said ARHBH during a predetermined mixing interval for said machine.

6. The combination of claim 2 further characterized by batch cycle totalizer means responsive to said output signals for calculating an average ram height over a batch cycle (ARHB) and means for preselecting a high limit (ARHBH) for said ARHB and for preselecting a low limit (ARHBL) for said ARHB, means for preselecting a target batch size for said charging chamber, and means for incrementally increasing subsequent target batch size in response to said ARHB not being greater than said ARHBL during a preceding batch cycle for said mixing machine.

7. The combination of claim 6 wherein said high pressure level is so selected that internal forces generated by the rotors acting on the ingredients being mixed cannot cause excessive movement of said ram in a direction opposite said movement toward said limit position, said excessive movement being defined as that ram position which creates an excessively large cavity for trapping ingredients in the throat area.

8. The combination of claim 7 further characterized by means for incrementally decreasing subsequent target batch size in response to said ARHB not being less than said ARHBH during a predetermined mixing interval for said machine.

9. In combination with a mixing machine having a housing with a mixing chamber and rotors therein for mixing ingredients provided in batches to a charging chamber communicating with the mixing chamber, and a reciprocable ram for moving the ingredients from the charging chamber into the mixing chamber, said ram cooperating with the housing to define a part of the mixing chamber, the improvement comprising:
    (a) fluid motor means for moving said ram toward a lower limit position wherein said ram is located adjacent the path of movement of the rotors but does not interfere with them,
    (b) fluid pressure control means for selectively coupling said fluid motor means to a source of fluid under pressure, said control means being capable of providing controllable fluid pressure levels selectively to said fluid motor means, said controllable fluid pressure levels being between a high pressure level and a low pressure level, (c) means for monitoring ram position, at least within a range of ram positions adjacent said lower limit position, and providing output signals related to ram position, (d) data storage means for storing data representative of an upper limit position and of said lower limit position within said range, (e) comparing means connected to said data storage means and to said monitoring means for comparing said output signals to said stored upper limit position data and said stored lower limit position data within said range, (f) said comparing means being connected to said fluid pressure control means for controlling said pressure control means, (g) said comparing means being responsive to comparison between the output signals and said upper limit position stored data indicating an existing ram position above said upper limit position for causing said pressure control means to provide said high pressure level to said fluid motor, (h) said comparing means being responsive to comparison between the output signals and said lower limit position stored data indicating an existing ram position below said lower limit position for causing said pressure control means to provide said low pressure level to said fluid motor, (i) said comparing means also including stored data representative of discrete pressure levels between said high pressure level and said low pressure level correlated with discrete ram positions between said upper limit position and said lower limit position, and (j) said comparing means being responsive to comparison between the output signals and said stored data representative of said discrete ram positions for determining discrete positions of said ram and for causing said pressure control means to provide discrete pressure levels to said fluid motor in correlation with said determined discrete ram positions.

10. In combination with a mixing machine having a housing with a mixing chamber and rotors therein for mixing ingredients provided in batches to a charging chamber communicating through a throat area with the mixing chamber, and a reciprocable ram for moving the ingredients from the charging chamber through said throat area into the mixing chamber, said ram cooperating with the housing to define a part of the mixing chamber, the improvement comprising:

(a) fluid motor means for moving said ram toward a lower limit position wherein said ram is located adjacent the path of movement of the rotors but does not interfere with them, (b) fluid pressure control means for selectively coupling said fluid motor means to a source of fluid under pressure, said control means being capable of providing at least two fluid pressure levels selectively to said fluid motor means (High and Low), (c) means for monitoring ram position, at least within a range of ram positions adjacent said lower limit position, and providing output signals related to ram position, (d) means for comparing said output signals to stored data representing upper limit and said lower limit ram positions within said range, (e) said control means being responsive to said comparing means, and said comparing means responding to the output signals indicating an existing ram position above said upper limit for causing said control means to provide said High pressure level to said fluid motor, (f) batch cycle totalizer means responsive to said output signals for calculating an average ram height over a batch cycle (ARHB), (g) means for preselecting a high limit (ARHBH) for said ARHB and for preselecting a low limit (ARHBL) for said ARHB, (h) means for preselecting a target batch size for said charging chamber, (i) means for incrementally increasing target batch size in response to said ARHB not being greater than said ARHBL during a predetermined mixing interval for said machine, and for incrementally decreasing target batch size in response to said ARHB not being less than said ARHBH during a predetermined mixing interval for said machine, (j) said comparing means responding to the output signals indicating an existing ram position below said lower limit for causing said control means to provide said Low pressure level to said fluid motor, and wherein said High pressure level is so selected that internal forces generated by the rotors acting on the ingredients being mixed cannot cause excessive movement of said ram in a direction opposite said movement toward said lower limit position, said excessive movement being defined as that ram position which creates an excessively large cavity for trapping ingredients in the throat area.

11. The method of operating a mixing machine having a housing with a mixing chamber and rotors therein for mixing ingredients introduced in batches to a charging chamber communicating with the mixing chamber and a reciprocatable ram for moving a charge of ingredients from the charging chamber into the mixing chamber and in which said ram is movable by fluid pressure toward a lower limit position wherein the ram just clears the turning rotors, and wherein the ram when in positions near said lower limit position cooperates with the housing for defining a part of the mixing chamber, said method comprising the steps of:

(a) providing a predetermined ram height high limit and a predetermined ram height low limit, said ram height high and low limits being within a range of ram positions near said lower limit position, (b) predetermining at least a high fluid pressure, (c) during mixing sensing positions of the ram at least within said range of ram positions, (d) initially applying said high fluid pressure for moving the ram down toward said predetermined low limit for moving the ingredients from said charging chamber into the mixing chamber, (e) averaging sensed positions of the ram over a plurality of respective time intervals during mixing for determining respective average ram heights which occurred during respective time intervals, (f) during mixing comparing respective average ram heights with said predetermined ram height high limit and with said predetermined ram height low limit, (g) decreasing fluid pressure from said high fluid pressure upon a respective determined average ram height being below said predetermined ram height low limit, and (h) applying said high fluid pressure upon a respective average ram height exceeding said predetermined ram height high limit.

12. The method of operating a mixing machine as claimed in claim 11, including the further steps of:

(i) predetermining a low fluid pressure, and (j) applying said low fluid pressure upon a respective average ram height being below said predetermined ram height low limit.

13. The method of operating a mixing machine as claimed in claim 12, including the step of:

(k) applying said low fluid pressure upon a respective average ram height being equal to said predetermined ram height low limit.

14. The method of operating a mixing machine as claimed in claim 12, comprising the further steps of:

(k) preselecting a ram "DOWN" position, and (l) averaging sensed positions of the ram only when the ram is down at least to said ram "DOWN" position.

15. The method of operating a mixing machine as claimed in claim 11, comprising the further steps of:

(i) determining an average ram height which occurred during the mixing of a batch of ingredients, and (j) providing said predetermined ram height high limit and said predetermined ram height low limit in relation to determined respective average ram heights which occurred during the mixing of a prior batch of ingredients.

16. The method of operating a mixing machine as claimed in claim 11, wherein:

(i) each respective time interval has the same time duration, and (j) the positions of the ram are sensed the same predetermined number of times during each respective time interval.

17. The method of operating a mixing machine as claimed in claim 16, wherein:

(k) each respective time interval has a duration of 5 seconds, and (l) the positions of the ram are sensed 50 times during the respective 5-second interval.

18. The method of operating a mixing machine as claimed in claim 11, comprising the further steps of:

(i) predetermining a first target batch size, (j) weighing a first batch of ingredients to be equal to said first target batch size, (k) charging said first batch into the charging chamber and thereafter mixing said first batch of ingredients, (l) determining an average ram height (ARHB) which occurred during the mixing of said first batch, (m) comparing said determined average ram height (ARHB) which occurred during said mixing of said first batch with a desired average ram height high limit (ARHBH) and with a desired average ram height low limit (ARHBL), and (n) if said determined average ram height (ARHB) which occurred during the mixing of said first batch is not greater than said predetermined ram height low limit (ARHBL), increasing the target batch size for a following batch of ingredients by a predetermined increment above said first target batch size, and if said determined average ram height (ARHB) is not less than said predetermined ram height high limit (ARHBH), decreasing the target batch size for a following batch of ingredients by a predetermined increment.

19. The method of operating a mixing machine having a housing with a mixing chamber and rotors therein for mixing ingredients introduced in batches to a charging chamber communicating with the mixing chamber and a reciprocatable ram for moving a charge of ingredients from the charging chamber into the mixing chamber and in which said ram is movable by fluid pressure toward a lower limit position wherein the ram just clears the turning rotors, and wherein the ram when in positions near said lower limit position cooperates with the housing for defining a part of the mixing chamber, said method comprising the steps of:

(a) predetermining an average ram height high limit desired to occur during the mixing of a batch of ingredients, (b) predetermining an average ram height low limit desired during the mixing of the batch of ingredients, (c) said predetermined average ram height high limit and said predetermined average ram height low limit being within a range of said positions near said lower limit position, (d) predetermining a first target batch size, (e) weighing a first batch of ingredients equal to said first target batch size, (f) charging said first batch into the charging chamber, (g) applying fluid pressure for moving the ram down toward said predetermined average ram height low limit and thereafter mixing said first batch of ingredients, (h) during mixing sensing positions of the ram, at least within said range of positions near said lower limit position, (i) determining an average ram height which occurred during the mixing of said first batch, (j) comparing said determined average ram height which occurred during the mixing of said first batch with said average ram height high limit and with said average ram height low limit desired to occur during the mixing of a batch, (k) if said determined average ram height is not above said average ram height low limit, increasing the target batch size for a following batch of ingredients by an increment above said first target batch size, and (l) if said determined average ram height is not below said average ram height high limit, decreasing the target batch size for a following batch of ingredients by an increment below said first target batch size.

20. The method of operating a mixing machine as claimed in claim 19, wherein:

(m) said increment increase above said first target batch size is a predetermined small percentage of said first target batch size, and (n) said increment decrease below said first target batch size is a predetermined small percentage of said first target batch size.

21. The method of operating a mixing machine as claimed in claim 20, wherein:

(o) said predetermined small percentage increase and said predetermined small percentage decrease are equal percentages.

22. In a mixing machine system including a housing with a mixing chamber and rotors therein for mixing ingredients introduced in batches to a charging chamber communicating with the mixing chamber and a reciprocatable ram for moving a charge of ingredients from the charging chamber into the mixing chamber and in which said ram is movable by applied fluid pressure toward a lower limit position wherein the ram just clears the turning rotors and wherein the ram when in positions near said lower limit position cooperates with the housing for defining a part of the mixing chamber, the improvement comprising:
  (a) means for controlling the applied fluid pressure and capable of selectively applying at least a high fluid pressure and a predetermined low fluid pressure,
  (b) sensing means for monitoring ram positions at least within a range of positions near said lower limit position during mixing of a batch of ingredients,
  (c) means for selectively setting a ram height high limit,
  (d) means for selectively setting a ram height low limit,
  (e) comprising means for comparing monitored ram positions during mixing of the batch with said ram height high limit and with said ram height low limit,
  (f) said comparing means being coupled to said means for controlling the applied fluid pressure for reducing the applied fluid pressure from said high fluid pressure during mixing upon monitored ram positions being below said ram height low limit, and
  (g) said comparing means controlling the applied fluid pressure for increasing the applied fluid pressure upon monitored ram positions being above said ram height high limit.

23. In a mixing machine system, the improvement as claimed in claim 22, in which:
  (h) said comparing means includes means for averaging sensed positions of the ram over a plurality of respective time intervals during a mixing cycle for determining respective average ram heights which occurred during respective time intervals,
  (i) said comparing means compares said average ram heights with said ram height high limit and with said ram height low limit,
  (j) means for selectively setting a "DOWN" position above said ram height high limit, and
  (k) means for discontinuing said averaging while said ram is raised above said DOWN position for accommodating raising and lowering of the ram for charging an additional ingredient into the batch being mixed.

24. In a mixing machine system, the improvement as claimed in claim 22, in which:
  (h) said means for selectively setting a ram height high limit selectively sets a predetermined average ram height high limit for mixing a batch of ingredients,
  (i) said means for selectively setting a ram height low limit selectively sets a predetermined average ram height low limit for mixing a batch of ingredients,
  (j) means for averaging monitored ram positions over respective predetermined intervals of time during mixing of a batch of ingredients for determining respective average ram hights which occurred during the respective intervals of time,
  (k) said sensing means for monitoring ram positions being coupled to said means for averaging monitored ram positions for providing said determined respective average ram heights,
  (l) said comparing means controlling the applied fluid pressure for reducing the applied fluid pressure from said high fluid pressure during mixing upon a determined respective average ram height being below said average ram height low limit, and
  (m) said comparing means controlling the applied fluid pressure for increasing the applied fluid pressure upon a determined respective average ram height being above said average ram height high limit.

25. In a mixing machine system, the improvements as claimed in claim 22, further comprising:
  (h) means for selectively setting a target batch size of ingredients to be mixed,
  (i) means for determining an average ram height which occurred during mixing of a batch of ingredients being coupled to said sensing means for monitoring ram positions for determining the average ram height which occurred during mixing of a weighed batch of ingredients,
  (j) means for selectively setting high and low limits for said average ram height during mixing of a weighed batch of ingredients, and
  (k) said comparing means automatically increasing said target batch size upon said average ram height which occurred during mixing of a weighed batch of ingredients being above said average ram height high limit during mixing of a weighed batch of ingredients and automatically decreasing said target batch size upon said average ram height which occurred during mixing of a weighed batch of ingredients being below said average ram height low limit during mixing of a weighed batch of ingredients.

* * * * *